(12) United States Patent
Tsutoh (10) Patent No.: US 6,505,413 B2
(45) Date of Patent: Jan. 14, 2003

(54) POSITION ADJUSTING MECHANISM AND IMAGE SCANNING APPARATUS WITH SUCH POSITION ADJUSTING MECHANISM

(75) Inventor: Satoru Tsutoh, Minamiashigara (JP)

(73) Assignee: Fuji Photo Film Co., Ltd., Kangawa-Ken (JP)

( * ) Notice: Subject to any disclaimer, the term of this patent is extended or adjusted under 35 U.S.C. 154(b) by 0 days.

(21) Appl. No.: 09/962,127

(22) Filed: Sep. 26, 2001

(65) Prior Publication Data

US 2002/0038517 A1 Apr. 4, 2002

(30) Foreign Application Priority Data

Oct. 3, 2000  (JP) ......................................... 2000-303954

(51) Int. Cl.[7] ................................................. G01B 5/25
(52) U.S. Cl. ........................................ 33/613; 411/383
(58) Field of Search ................... 33/613, 645; 358/474; 378/205, 206, 207; 411/383, 384, 388, 389, 411, 412, 413

(56) References Cited

U.S. PATENT DOCUMENTS

| | | | | | |
|---|---|---|---|---|---|
| 4,223,585 A | * | 9/1980 | Barth et al. | ................. | 411/386 |
| 4,318,135 A | * | 3/1982 | Allis et al. | ................... | 358/474 |
| 4,538,355 A | * | 9/1985 | Morghen | ...................... | 33/613 |
| 4,819,340 A | * | 4/1989 | DeForrest | ...................... | 33/613 |
| 4,877,364 A | * | 10/1989 | Sorrentino | ................... | 411/412 |
| 5,937,613 A | * | 8/1999 | Vess, Sr. | ....................... | 33/613 |
| 6,227,430 B1 | * | 5/2001 | Rosen et al. | ................. | 411/412 |
| 6,282,806 B1 | * | 9/2001 | Kable et al. | .................. | 33/645 |
| 6,381,000 B1 | * | 4/2002 | Tsuto | .......................... | 358/474 |
| 6,382,654 B1 | * | 5/2002 | Mahncke | ..................... | 411/412 |
| 6,443,680 B1 | * | 9/2002 | Bodin | ......................... | 411/383 |

* cited by examiner

*Primary Examiner*—G. Bradley Bennett
(74) *Attorney, Agent, or Firm*—Sughrue Mion, PLLC (57) ABSTRACT

The position adjusting mechanism has a first screw, a second screw connected to the upper end of the first screw and having a pitch smaller than the first screw, and a hollow support member displaceably threaded over the second screw. The image scanning apparatus has an auxiliary scanning feed mechanism having a guide member supported on the hollow support member. A turning device such as a screwdriver is inserted from above the guide member into the hollow support member through a through hole and an insertion hole that are defined respectively in the guide member and the support member. When the second screw is turned by the turning device, the hollow support member and the guide member supported on the hollow support member are displaced upwardly or downwardly.

12 Claims, 5 Drawing Sheets

POSITION ADJUSTING MECHANISM AND IMAGE SCANNING APPARATUS WITH SUCH POSITION ADJUSTING MECHANISM

BACKGROUND OF THE INVENTION

1. Field of the Invention

The present invention relates to a position adjusting mechanism having two screws of different pitches connected to each other, and an image scanning apparatus having such a position adjusting mechanism for positioning a guide member for guiding an image recording carrier.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display unit such as a CRT or the like.

The stimulable phosphor is a phosphor which, when exposed to an applied radiation (X-rays, α-rays, γ-rays, electron beams, ultraviolet radiation, or the like), stores a part of the energy of the radiation, and, when subsequently exposed to applied stimulating rays such as visible light, emits light in proportion to the stored energy of the radiation. Usually, a sheet provided with a layer of the stimulable phosphor is used as a stimulable phosphor sheet.

The above known system includes an image information reading apparatus which comprises a reading unit for reading the recorded radiation image information carried on the stimulable phosphor sheet, and an erasing unit for erasing residual radiation image information remaining on the stimulable phosphor sheet after the recorded radiation image information has been read from the stimulable phosphor sheet. The image information reading apparatus also includes a loading unit for accommodating a cassette which stores a stimulable phosphor sheet with the radiation image information of a subject being recorded thereon by an external exposure device.

When the cassette is opened, a sheet picking means removes the stimulable phosphor sheet from the cassette, and the stimulable phosphor sheet is fed to the reading unit by a sheet feed means.

The reading unit has an auxiliary scanning feed mechanism, a laser beam applying means for applying a laser beam, and a light guide means. The auxiliary scanning feed mechanism has first and second roller pairs rotatable in synchronism with each other, and a guide member for guiding the stimulable phosphor sheet as it is fed toward or away from the first and second roller pairs. Each of the first and second roller pairs comprises a drive roller and a nip roller movable toward and away from the drive roller.

The stimulable phosphor sheet fed to the reading unit is guided by the guide member and the first roller pair to a laser beam applying. position between the first roller pair and the second roller pair.

The laser beam emitted from the laser beam applying means is applied to an image recording surface of the stimulable phosphor sheet. Upon exposure to the laser beam, the stimulable phosphor sheet emits light representing the stored image information toward the light guide means. The light is then guided to a light guide of the light guide means. The light is applied to a photoelectric transducer mounted on the light guide, and converted into an electric signal by the photoelectric transducer. The electric signal is supplied to a display unit, which converts the electric signal into a light signal that is outputted as image information.

The stimulable phosphor sheet from which the image has thus been read is delivered to the erasing unit where remaining image information is erased from the stimulable phosphor sheet. Thereafter, the stimulable phosphor sheet is inserted back into the cassette in the loading unit for reuse.

The guide member of the auxiliary scanning feed mechanism needs to be positioned with high accuracy. If the guide member were positioned with low accuracy, then the laser beam would not be applied at a desired angle to the stimulable phosphor sheet, with the result that the image would not be displayed clearly on the display unit.

The guide member is usually positioned when the image information reading apparatus is manufactured. Specifically, the worker uses a leveler to position the four corners of the guide member at a predetermined height and then fixes the guide member that has been positioned. According to such a positioning process, it is highly difficult for the worker to displace the guide member slightly, and it is time-consuming for the worker to position the guide member highly accurately. The time-consuming positioning process tends to lower the efficiency of the production of the image information reading apparatus.

One known position adjusting mechanism comprises a right-hand screw connected to the upper end of a left-hand screw. When the right-hand screw is turned, the left-hand screw is turned in unison therewith, thus positionally displacing a member connected to the left-hand screw. Such a known position adjusting mechanism may be used to position the above guide member.

However, the known position adjusting mechanism is disadvantageous in that it produces a large displacement in one positioning operation. Since it is difficult for the position adjusting mechanism to displace the guide member slightly, it takes a long period of time to position the guide member with high accuracy. Another problem is that the manufacturing cost of the image information reading apparatus is high because the left-hand screw that needs to be used is more expensive than the right-hand screw.

SUMMARY OF THE INVENTION

It is a primary object of the present invention to provide a position adjusting mechanism which is capable of displacing a member simply and easily by a slight distance and can be manufactured at a low cost, and an image scanning apparatus which incorporates such a position adjusting mechanism.

Another object of the present invention is to provide an image scanning apparatus which prevents a guide member that has been positioned from being displaced.

Still another object of the present invention is to provide an image scanning apparatus which allows a turning means to be inserted easily into a support member and which is capable of positioning a guide member simply and easily by turning a second screw with the turning means.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A position adjusting mechanism according to an embodiment of the present invention will be described below in detail in connection with an image scanning apparatus which incorporates the position adjusting mechanism, with reference to the drawings.

Figure 1:
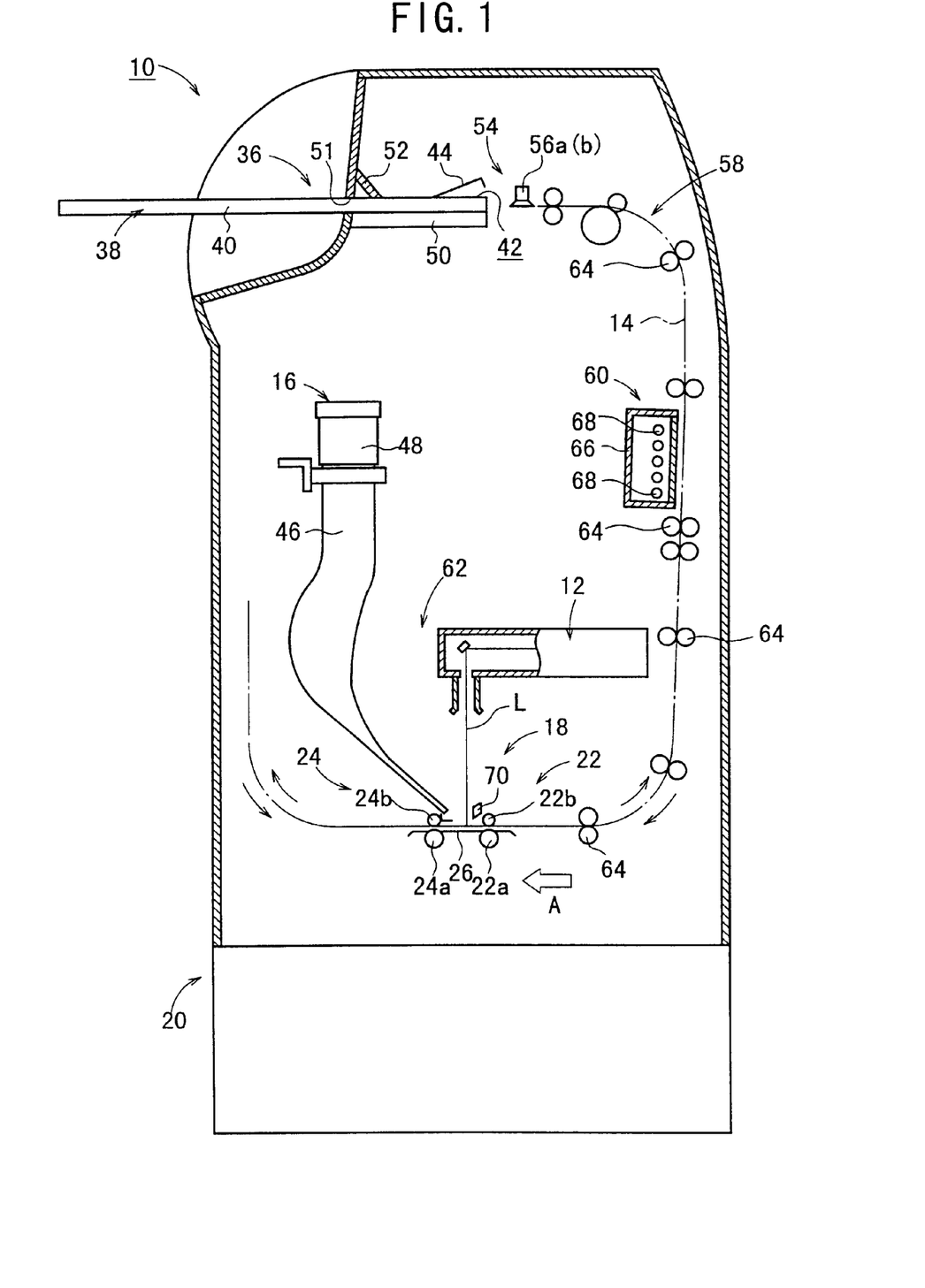
FIG. 1 is a vertical cross-sectional view of an image information reading apparatus according to the present invention.

As shown in FIG. 1, an image information reading apparatus (an image scanning apparatus) 10 has a laser beam applying means 12 for applying laser beam as scanning beam, a light guide means 16 for guiding light emitted from an image recording surface of a stimulable phosphor sheet 14 as an image recording carrier, and an auxiliary scanning feed mechanism 18 for feeding the stimulable phosphor sheet 14 in a direction toward or away from the path of a laser beam L emitted from the laser beam applying means 12. The laser beam applying means 12, the light guide means 16, and the auxiliary scanning feed mechanism 18 are housed in an apparatus housing 20.

Figure 2:
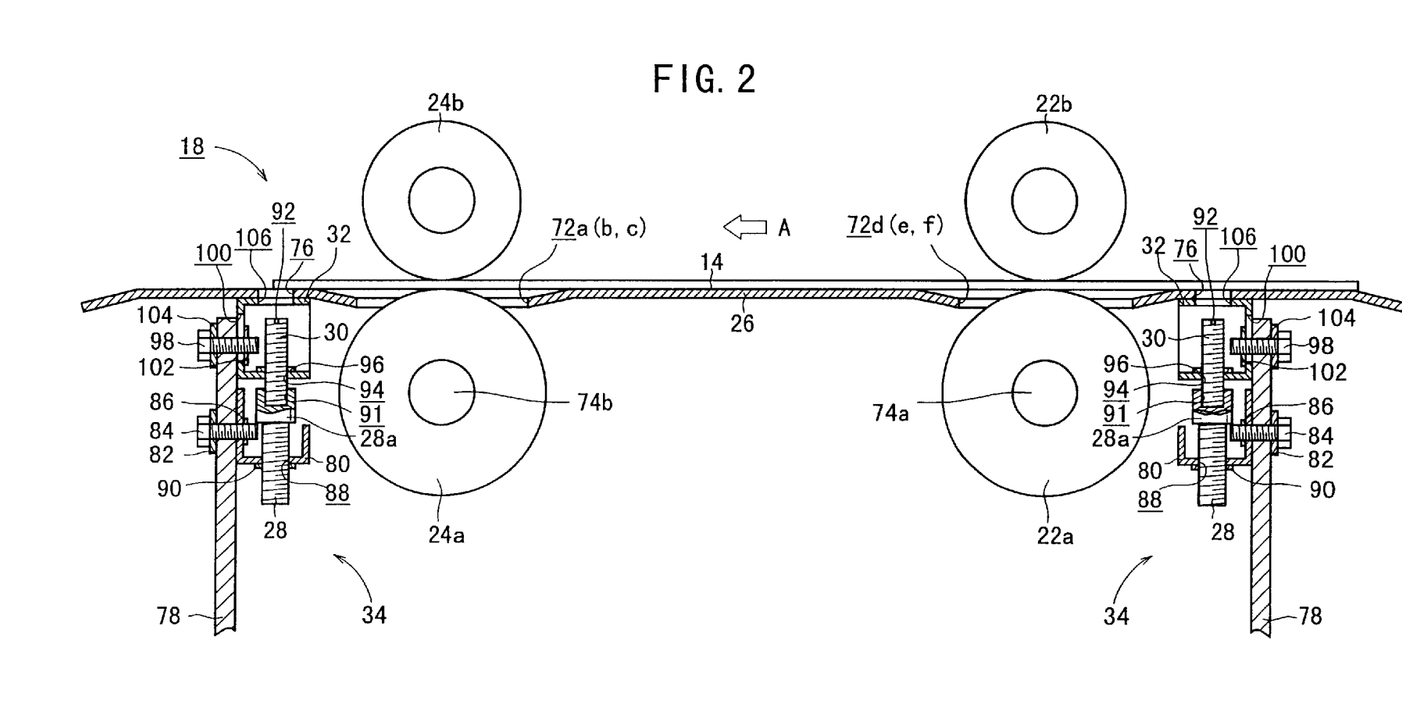
FIG. 2 is a vertical cross-sectional view of position adjusting mechanisms incorporated in the image information reading apparatus shown in FIG. 1.

The auxiliary scanning feed mechanism 18 has first and second roller pairs 22, 24 rotatable in synchronism with each other, and a guide member 26 for guiding the stimulable phosphor sheet 14 as it is fed toward or away from the first and second roller pairs 22, 24. As shown in FIG. 2, the guide member 26 is positioned by a plurality of position adjusting mechanisms 34 each comprising a first screw 28, a second screw 30 connected to the upper end of the first screw 28, and a hollow support member 32 of a substantially U-shaped cross section which is threaded over the second screw 30 for displacement in the longitudinal direction of the second screw 30.

As shown in FIG. 1, the stimulable phosphor sheet 14 is housed in a cassette 38 which is removably loaded in a cassette loading region 36 disposed in an upper portion of a control panel (front panel) of the apparatus housing 20. Specifically, the cassette 38 comprises a casing 40 for housing the stimulable phosphor sheet 14 therein, and a lid 44 openably and closably mounted on the casing 40 over an opening 42 defined in the casing 40.

The stimulable phosphor sheet 14 is an image-readout-type sheet comprising a base with an image recording surface thereon. As described later on, when stimulating light is applied to the image recording surface of the stimulable phosphor sheet 14, the stimulable phosphor sheet 14 emits light representing image information recorded on the image recording surface. The emitted light is guided by a light guide 46 of the light guide means 16 and then converted by a photomultiplier 48 mounted on the upper end of the light guide 46 into an electric signal, which is outputted from the light guide means 16.

A support table 50 for placing the cassette 38 thereon is disposed behind an opening 51 in the cassette loading region 36. The cassette 38 can be inserted through the opening 51 onto the support table 50. A shutter 52 is openably and closably positioned behind the opening 51 for blocking light against entry into the housing apparatus 20.

The cassette loading region 36 includes a sheet picking mechanism 54 for removing the stimulable phosphor sheet 14 from the cassette 38 and also returning the stimulable phosphor sheet 14 back into the cassette 38 after recorded image information has been read and remaining image information has been erased. The sheet picking mechanism 54 has suction cups 56a, 56b that are movable into and out of the cassette 38 with the lid 44 being opened for storing the stimulable phosphor sheet 14 into the cassette 38 or removing the stimulable phosphor sheet 14 from the cassette 38.

An erasing device 60 and a reading unit 62 are positioned below the sheet picking mechanism 54 and connected thereto by a feed system 58. The feed system 58 comprises a plurality of roller pairs 64 that make up a vertical feed path extending from the cassette loading region 36 and a horizontal feed path extending from the lower end of the vertical feed path. The erasing device 60 is disposed on the vertical feed path. The erasing device 60 comprises an erasing unit 66 disposed on one side of the vertical feed path so as to face the image recording surface of the stimulable phosphor sheet 14. The erasing unit 66 has a vertical array of erasing light sources 68.

The reading unit 62 is disposed on the horizontal feed path of the feed system 58. The reading unit 62 comprises the laser beam applying means 12 which applies the laser beam L in a main scanning direction to the stimulable phosphor sheet 14 which is being fed in an auxiliary scanning direction indicated by the arrow A (substantially perpendicular to the main scanning direction), the light guide means 16 which photoelectrically reads light emitted from the stimulable phosphor sheet 14 upon exposure to the laser beam L, and a reflecting mirror 70 for efficiently collecting the emitted light toward the light guide means 16.

As described above, the auxiliary scanning feed mechanism 18 has the first and second roller pairs 22, 24 and the guide member 26. The first and second roller pairs 22, 24 comprise respective drive rollers 22a, 24a and respective nip rollers 22b, 24b movable toward and away from the drive rollers 22a, 24a.

Figure 3:
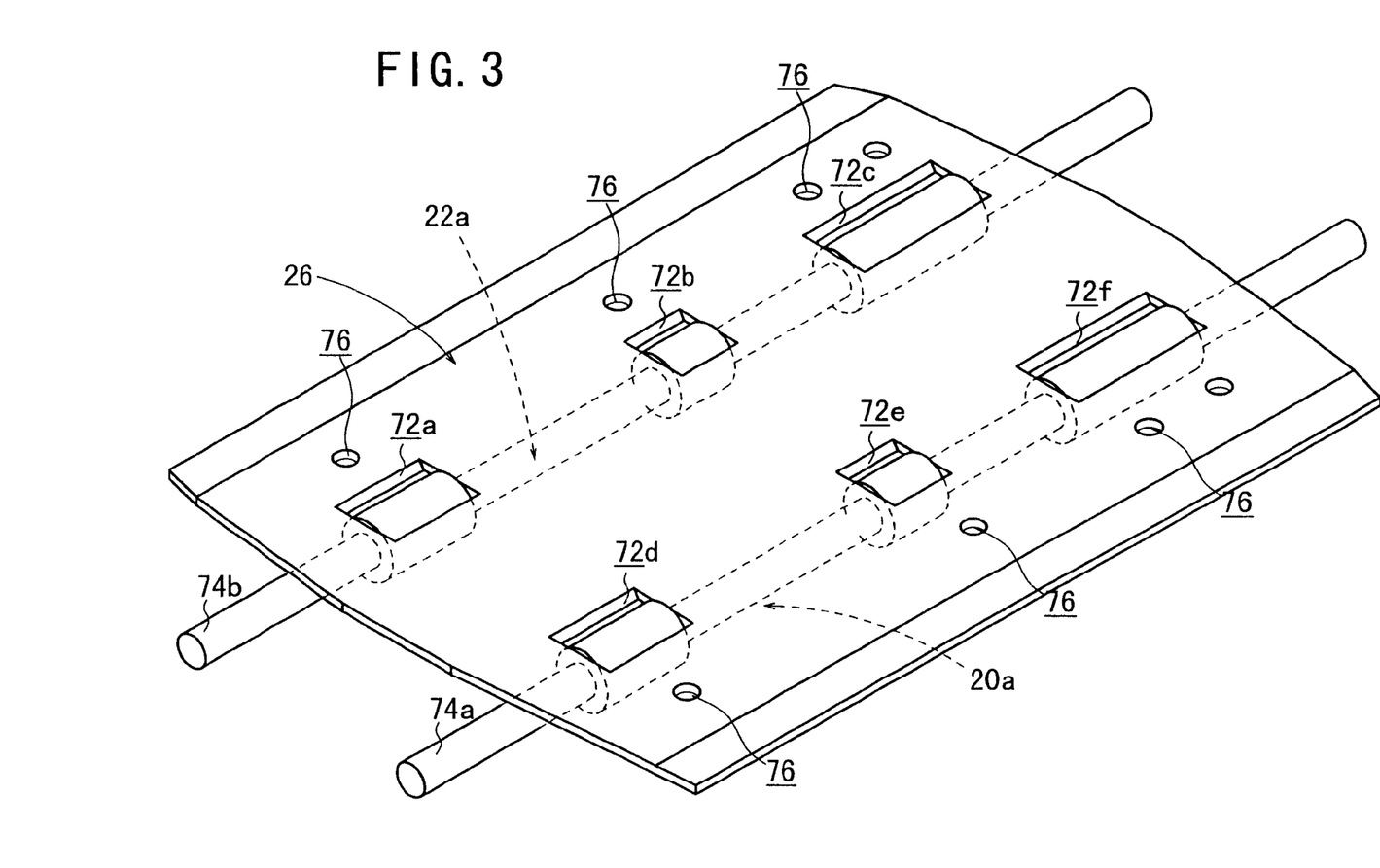
FIG. 3 is a perspective view of a guide member and drive rollers of an auxiliary scanning feed mechanism of the image information reading apparatus shown in FIG. 1.

As shown in FIG. 3, the guide member 26 has six openings 72a through 72f for exposing rollers. The drive rollers 22a, 24a have respective sets of three roller elements interconnected by respective rotatable shafts 74a, 74b. The roller elements of the drive rollers 22a, 24a have outer circumferential walls exposed through the openings 72a through 72f.

The guide member 26 also has eight through holes 76 for inserting therein the tip end of a screwdriver or the like (not shown) for turning the second screws 30 of the position adjusting mechanisms 34.

The guide member 26 is positioned by being supported on the hollow support members 32 of the position adjusting mechanisms 34 (see FIG. 2). The guide member 26 is displaceable when the support members 32 are displaced.

Structural details of the position adjusting mechanisms 34 will be described below with reference to FIG. 2.

As described above, each of the position adjusting mechanisms 34 has the first screw 28 and the second screw 30 connected to the upper end of the first screw 28. The first screw 28 is threaded through a substantially L-shaped engaging member 80 that is fixed to a frame 78 disposed in the apparatus housing 20. The frame 78 and an elongate side panel of the engaging member 80 have respective bolt holes defined therein. The engaging member 80 is positioned and fixed to the frame 78 by a bolt 84 which is inserted through the bolt hole in the frame 78 with a washer 82 held against the head of the bolt 84 and a nut 86 which is threaded over the tip end of the bolt 84 that projects from the bolt hole in the engaging member 80.

The engaging member 80 has a bottom panel with a through hole 88 defined therein by an internally threaded circumferential side wall, and the first screw 28 is threaded through the through hole 88 so that the first screw 28 can be turned about its own axis. A nut 90 is threaded over the lower tip end of the first screw 28 which projects downwardly from the through hole 88, for preventing the first screw 28 from being loosened.

The first screw 28 has a head 28a on its upper end, and the head 28a has a bolt hole 91 defined centrally in its upper end by an internally threaded circumferential side wall. The second screw 30 has its lower tip end threaded in the bolt hole 91. Therefore, the second screw 30 is threadedly connected to the first screw 28 such that when the second screw 30 is turned about its own axis, the first screw 28 is turned about its own axis in the same direction as the second screw 30. The second screw 30 has a slot 92 defined in its upper end for receiving the tip end of a screwdriver (not shown).

The first and second screws 28, 30 are externally threaded and comprise right-hand screws. When the second screw 30 is turned clockwise, therefore, the first and second screws 28, 30 are displaced downwardly in FIG. 2. The first screw 28 has a pitch, i.e., the distance between adjacent crests or roots, greater than the second screw 30.

The second screw 30 is threaded through a bottom panel of the support member 32. Specifically, the bottom panel of the support member 32 has a through hole 94 defined therein by an internally threaded circumferential side wall, and the second screw 30 is threaded through the through hole 94. A nut 96 is threaded over the second screw 30 and held against the bottom panel of the hollow support member 32.

The support member 32 has a side panel held against the frame 78 and having a vertically elongate through hole 100 defined therein with the tip end of a bolt 98 extending through the through hole 100. When a nut 102 is tightened on the bolt 98 extending through the through hole 100 with a washer 104 held against the head of the bolt 98, the support member 32 is positioned and fixed to the frame 78. Stated otherwise, the bolt 98 and the nut 102 serve as a lock mechanism for positioning and fixing the support member 32.

The support member 32 has a top panel having an insertion hole 106 defined therein in alignment with one of the through holes 76 defined in the guide member 26. The screwdriver or the like for turning the second screw 30 can be inserted from above the guide member 26 through the through hole 76 and the insertion hole 106 into the support member 32.

The image information reading apparatus 10 has eight position adjusting mechanisms 34 that are positioned respectively beneath the eight through holes 76 in the guide member 26.

The laser beam L emitted from the laser beam applying means 12 is applied substantially vertically to an area of the stimulable phosphor sheet 14 between the first and second roller pairs 22, 24 (see FIG. 1).

The light guide means 16 has the photomultiplier 48 and the light guide 46 joined to the lower end of the photomultiplier 48. The light guide 46 is disposed such that its lower tip end is positioned near the area of the stimulable phosphor sheet 14 where the laser beam L is applied (see FIG. 1). Light emitted from the image recording surface of the stimulable phosphor sheet 14 is collected and guided by the light guide 46 toward the photomultiplier 48 and then converted by a photoelectric transducer in the photomultiplier 48 into an electric signal, which is outputted from the photomultiplier 48.

The light guide 46 is made of a light-transmissive material such as acrylic resin or the like, and has a flat shape near the area of the stimulable phosphor sheet 14 where the laser beam L is applied, but is curved and constricted toward the photomultiplier 48. The photomultiplier 48 is mounted on the upper end of the constricted portion of the light guide 46.

The image information reading apparatus 10 is basically constructed as described above. Operation of the image information reading apparatus 10 will be described below.

The guide member 26 of the auxiliary scanning feed mechanism 18 is positioned and fixed as follows: For positioning the guide member 26, the bolt 98 of each of the position adjusting mechanisms 34 is loosened.

Figure 4:
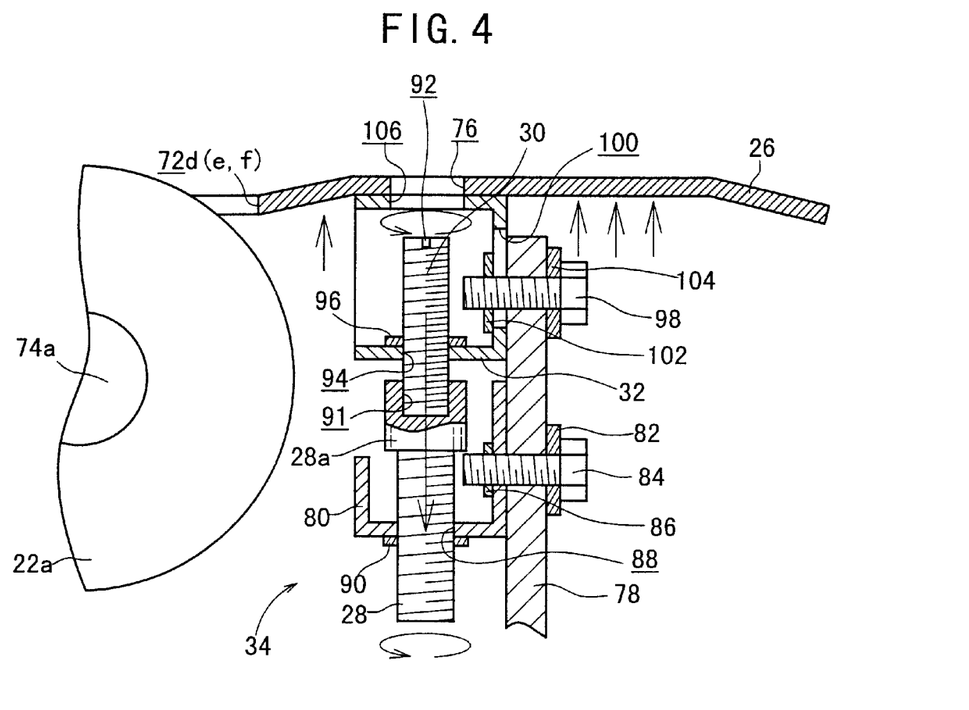
FIG. 4 is an enlarged fragmentary vertical cross-sectional view showing the guide member as it is lifted by the position adjusting mechanism.

For elevating a desired region of the guide member 26, the tip end of a screwdriver is inserted into the through hole 76 and the insertion hole 106 that are closest to the region to be elevated. The tip end of the screwdriver is placed into the support member 32 until it engages in the slot 92 in the upper end of the second screw 80. Then, the screwdriver is turned counterclockwise, turning the second screw 30 and the first screw 28 counterclockwise in unison with each other, as shown in FIG. 4. The screwdriver is omitted from illustration in FIG. 4.

Since the first and second screws 28, 30 are right-hand screws, the first and second screws 28, 30 are elevated. The support member 32 is lowered along the shank of the second screw 30. Since the pitch of the first screw 28 is larger than the pitch of the second screw 30, the first and second screws 28, 30 are elevated a greater distance than the support member 32 is lowered. As a result, the support member 32 and the region of the guide member 26 which is supported by the support member 32 are elevated by a distance which is equal to the difference between the distance by which the first and second screws 28, 30 are elevated and the distance by which the support member 32 is lowered.

The distance by which the guide member 26 is elevated can be controlled highly accurately by adjusting the angular displacement of the second screw 30. A specific example in which the first screw 28 has a pitch of 0.7 mm and the second screw 30 has a pitch of 0.5 mm will be described below.

When the second screw 30 is turned counterclockwise to make one revolution, the first screw 28 connected to the second screw 30 also makes one revolution. Since the pitch of the first screw 28 is 0.7 mm, the first and second screws 28, 30 are elevated by 0.7 mm. Because the engaging member 80 through which the first screw 28 is threaded is fixed to the frame 78, the engaging member 80 is not displaced when the second screw 30 is turned.

At this time, the support member 32 is not fixed in position. Therefore, when the second screw 30 is turned counterclockwise, the support member 32 is lowered along the shank of the second screw 30 by the pitch of the second screw 30, i.e., 0.5 mm.

Thus, the support member 32 is lowered 0.5 mm along the shank of the second screw 30 which is elevated 0.7 mm. As a consequence, the support member 32 and the region of the guide member 26 which is supported by the support member 32 are elevated 0.2 mm from the position which they took before the first and second screws 28, 30 are turned.

It follows, therefore, that for elevating the guide member 26 by 0.1 mm, the second screw 30 may be turned counterclockwise to make one half of a revolution.

After the guide member 26 has been positioned, the bolt 98 is tightened in the nut 102 to fix the support member 32 firmly to the frame 78. The guide member 26 that has been positioned is now prevented from being unduly displaced.

When the guide member 26 is lowered, the distance by which it is lowered can also be controlled highly accurately. Such a descent control process for the guide member 26 will be described below in specific detail with reference to FIG. 5.

Figure 5:
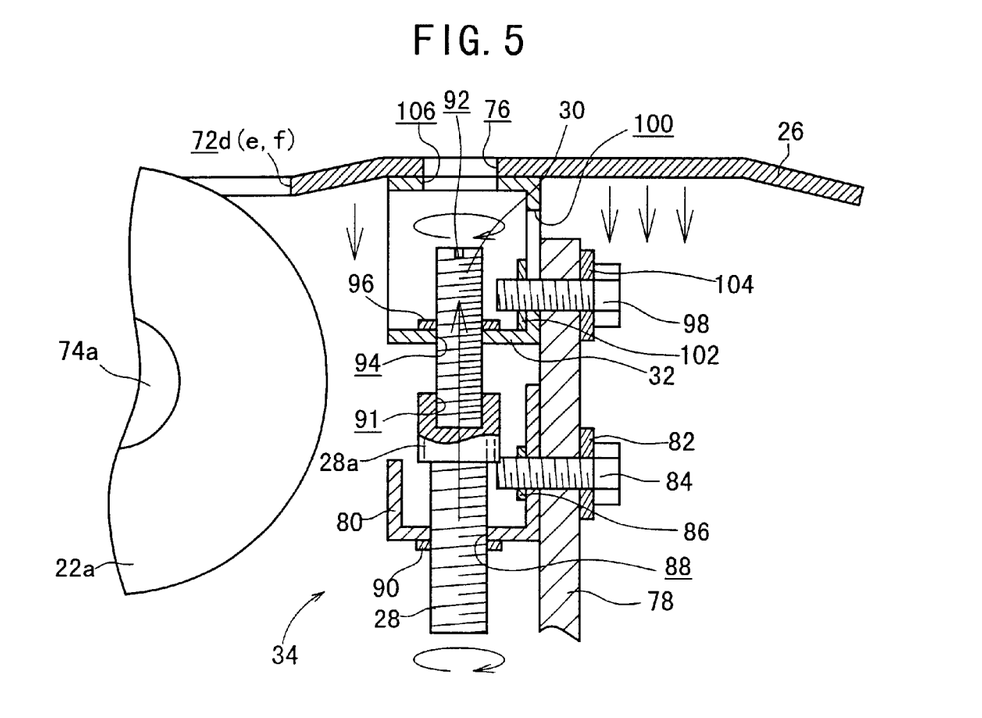
FIG. 5 is an enlarged fragmentary vertical cross-sectional view showing the guide member as it is lowered by the position adjusting mechanism.

When the second screw 30 is turned clockwise to make one revolution, the first screw 28 connected to the second screw 30 also makes one revolution. As a result, the first and second screws 28, 30 are lowered 0.7 mm. Therefore, when the second screw 30 is turned clockwise, the support member 32 is elevated along the shank of the second screw 30 by 0.5 mm.

Thus, the support member 32 is elevated 0.5 mm along the shank of the second screw 30 which is lowered 0.7 mm. As a consequence, the support member 32 and the region of the guide member 26 which is supported by the support member 32 are lowered 0.2 mm from the position which they took before the first and second screws 28, 30 are turned.

Thereafter, the bolt 98 is tightened in the nut 102 to fix the support member 32 firmly to the frame 78. The guide member 26 that has been positioned is now prevented from being unduly displaced.

As described above, the guide member 26 can be displaced slightly through a simple process by the operator who inserts the tip end of a screwdriver or the like into the slot 92 of the second screw 30 and turns the second screw 30. Accordingly, the positioning of the guide member 26 can simply and easily be controlled with high accuracy. When the support member 32 which supports the guide member 26 is positioned and fixed by the bolt 98 and the nut 102, the guide member 26 is also positioned and fixed.

Since both the first and second screws 28, 30 are right-hand screws, the position adjusting mechanisms 34 can be manufactured at a relatively low cost. Therefore, the manufacturing cost of the image information reading apparatus 10 is not increased.

A process of reading image information which is carried out by the image information reading apparatus 10 will be described below with reference to FIG. 1.

The cassette 38 housing the stimulable phosphor sheet 14 with the radiation image information of a subject such as a human body being recorded thereon by an exposure device, not shown, is loaded into the cassette loading region 36 of the image information reading apparatus 10. The cassette 38 is inserted to a given position in the apparatus housing 20 along the support table 50 behind the opening 51 in the cassette loading region 36. When the cassette 38 is inserted, its leading end pushes open the shutter 52, and the lid 44 is opened to a given angular position.

The suction cups 56a, 56b of the sheet picking mechanism 54 are displaced from an upper position obliquely downwardly into the cassette 38 toward the base of the stimulable phosphor sheet 14 while being kept out of interference with the lid 44. Then, the suction cups 56a, 56b attract the base of the stimulable phosphor sheet 14 in the cassette 38. The suction cups 56a, 56b are then displaced out of the cassette 38 toward the feed system 58, and carries the stimulable phosphor sheet 14 until the leading end thereof is gripped by the first roller pair 64 of the feed system 58.

The roller pairs 64 are rotated to feed the stimulable phosphor sheet 14 horizontally and then vertically downwardly along the vertical feed path of the feed system 58. After the stimulable phosphor sheet 14 has passed through the erasing device 60, the stimulable phosphor sheet 14 is fed along the horizontal feed path and then placed on the guide member 26 of the reading unit 62.

The various regions of the guide member 26 have been positioned highly accurately by the position adjusting mechanisms 34 and fixed to the frame 78 in the apparatus housing 20, as described above. Between the roller pairs 22, 24, the image recording surface of the stimulable phosphor sheet 14 which is guided along the guide member 26 by the roller pair 22 in the auxiliary scanning direction indicated by the arrow A is irradiated with the laser beam L at a given angle at all times. Specifically, the laser beam L emitted from the laser beam applying means 12 is applied substantially perpendicularly to the image recording surface of the stimulable phosphor sheet 14 to scan the image recording surface in the main scanning direction.

Upon exposure of the laser beam L, the image recording surface of the stimulable phosphor sheet 14 emits light which represents image information recorded on the stimulable phosphor sheet 14. The emitted light is photoelectrically read by the light guide means 16. Specifically, the emitted light is guided by the light guide 46 of the light guide means 16. Light emitted from the stimulable phosphor sheet 14 away from the light guide 46 is reflected by the reflecting mirror 70 back to the light guide 46. The light is then guided through the light guide 46 to the photomultiplier 48, and converted by the photoelectric transducer in the photomultiplier 48 into an electric signal, which is outputted from the photomultiplier 48 to an external circuit (not shown).

When the image information recorded on the stimulable phosphor sheet 14 is thus read, the laser beam L is applied to the image recording surface of the stimulable phosphor sheet 14 at a given angle at all times. Therefore, an image based on the read image information can be displayed clearly on a display unit (not shown).

After the image information recorded on the stimulable phosphor sheet 14 has been read, the stimulable phosphor sheet 14 is switched back by the auxiliary scanning feed mechanism 18, and fed vertically upwardly through the erasing unit 66 of the erasing device 60 toward the sheet picking mechanism 54. At this time, the erasing light sources 68 of the erasing unit 66 are energized to apply erasing light to the image recording surface of the stimulable phosphor sheet 14 thereby to erase any remaining image information from the stimulable phosphor sheet 14. Thereafter, the stimulable phosphor sheet 14 is attracted by the suction cups 56a, 56b and returned back into the cassette 38. One cycle of image reading operation is not put to an end.

It is possible to record image information on the stimulable phosphor sheet 14 from which remaining image information has been erased.

In the above embodiment, the first screw 28 whose pitch is greater than the second screw 30 is employed. However, the first screw 28 whose pitch is smaller than the second screw 30 may be employed. For example, the first screw 28 may have a pitch of 0.5 mm and the second screw 30 may have a pitch of 0.7 mm. With this modification, when the second screw 30 is turned clockwise to make one revolution, the first and second screws 28, 30 are lowered 0.5 mm. Since the support member 32 is elevated 0.7 mm along the second screw 30, the support member 32 is elevated 0.2 mm from the original position.

While both the first and second screws 28, 30 are right-hand screws in the above embodiment, both the first and second screws 28, 30 may be left-hand screws.

In the above embodiments, the position adjusting mechanisms 34 are exemplarily used in an image information reading apparatus. Instead, the position adjusting mechanisms 34 can be used in an image recording apparatus or an image scanning apparatus. The image recording apparatus records image on an image recording carrier such as a photosensitive medium. A typical example of the image scanning apparatus is a scanner for photoelectrically reading image information carried on an original by applying scanning beam thereto. In these cases, the size of a cassette may be set appropriately for housing an image recording carrier.

With the position adjusting mechanism according to the present invention, the first and second screws which are tightened in the same direction and have different pitches are connected to each other, the first screw is threaded through a fixed member, and a member threaded over the second screw is positionally displaced by turning the first and second screws in the same direction.

Since the member threaded over the second screw is displaced by a distance corresponding the difference between the pitch of the first screw and the pitch of the second screw, the member can be displaced slightly. As both the first and second screws can be inexpensive right-hand screws, the position adjusting mechanism can be manufactured at a low cost.

The image scanning apparatus incorporates above position adjusting mechanisms. Therefore, the guide member for guiding an image recording carrier toward or away from the portion where the scanning beam is applied can be positionally controlled with high accuracy.

Since the scanning beam is applied to the image recording surface of the stimulable phosphor sheet reliably at a desired angle, the image information reading apparatus can display a clear image on the display unit based on the image information recorded on the stimulable phosphor sheet.

Although a certain preferred embodiment of the present invention has been shown and described in detail, it should be understood that various changes and modifications may be made therein without departing from the scope of the appended claims.

What is claimed is:

1. A position adjusting mechanism comprising:
   a first screw threaded through a member which is positioned and fixed; and
   a second screw connected to a head of said first screw for turning movement in the same direction as said first screw to positionally displace a member threaded over said second screw when said first screw is turned in unison with said second screw;
   said first screw and said second screw being tightenable in one direction;
   said first screw and said second screw having respective pitches which are different from each other.

2. A position adjusting mechanism according to claim 1, further comprising:
   a lock mechanism for positioning and fixing the member threaded over said second screw.

3. An image scanning apparatus for applying scanning light to an image recording carrier thereby reading or recording image information, comprising;
   scanning beam applying means for applying the scanning beam to said image recording carrier;
   an auxiliary scanning feed mechanism for feeding said image recording carrier in an auxiliary scanning direction substantially perpendicular to a main scanning direction in which said scanning beam is applied, said auxiliary scanning feed mechanism having a guide member for guiding said image recording carrier; and
   a position adjusting mechanism for displacing said guide member, said position adjusting mechanism having a first screw and a second screw which are connected to each other for turning movement in the same direction as each other, said first screw and said second screw having respective pitches which are different from each other.

4. An image scanning apparatus according to claim 3, wherein said position adjusting mechanism has a hollow support member displaceably threaded over said second screw, said guide member being displaceably supported on said hollow support member.

5. An image scanning apparatus according to claim 3, further comprising:
   an apparatus housing; and
   a lock mechanism for positioning and fixing said hollow support member in said apparatus housing.

6. An image scanning apparatus according to claim 3, wherein said hollow support member is disposed below said guide member, said hollow support member having a top panel, said top panel and said guide member having respective through holes defined therein for inserting turning means for turning said second screw therethrough.

7. An image scanning apparatus according to claim 4, further comprising:
   an apparatus housing; and
   a lock mechanism for positioning and fixing said hollow support member in said apparatus housing.

8. An image scanning apparatus according to claim 4, wherein said hollow support member is disposed below said guide member, said hollow support member having a top panel, said top panel and said guide member having respective through holes defined therein for inserting turning means for turning said second screw therethrough.

9. An image scanning apparatus according to claim 5, wherein said hollow support member is disposed below said guide member, said hollow support member having a top panel, said top panel and said guide member having respective through holes defined therein for inserting turning means for turning said second screw therethrough.

10. An image scanning apparatus according to claim 7, wherein said hollow support member is disposed below said guide member, said hollow support member having a top panel, said top panel and said guide member having respective through holes defined therein for inserting turning means for turning said second screw therethrough.

11. An image scanning apparatus according to claim 3, further comprising light guide means for guiding light emitted from said image recording carrier when said scanning beam is applied to said image recording carrier.

12. An image scanning apparatus according to claim 10, further comprising light guide means for guiding light emitted from said image recording carrier when said scanning beam is applied to said image recording carrier.

* * * * *

UNITED STATES PATENT AND TRADEMARK OFFICE
CERTIFICATE OF CORRECTION

PATENT NO.     : 6,505,413 B2
DATED          : January 14, 2003
INVENTOR(S)    : Satoru Tsutoh It is certified that error appears in the above-identified patent and that said Letters Patent is hereby corrected as shown below:

<u>Title page,</u>
Item [73], Assignee, should read -- Fuji Photo Film Co., Ltd., Kanagawa-Ken (JP) --

Signed and Sealed this

Seventeenth Day of June, 2003

JAMES E. ROGAN
*Director of the United States Patent and Trademark Office*